OR 3,829,193

United States
Tsunoda et al.

[11] 3,829,193
[45] Aug. 13, 1974

[54] IMPROVED RANDOM PHASE PLATE FOR FOURIER TRANSFORM HOLOGRAPHY

[75] Inventors: Yoshito Tsunoda; Yoshitada Oshida, both of Tokyo, Japan

[73] Assignee: Hitachi, Ltd., Tokyo, Japan

[22] Filed: Sept. 18, 1972

[21] Appl. No.: 289,644

[30] Foreign Application Priority Data
Sept. 16, 1971 Japan..........................46-71196

[52] U.S. Cl.................................. 350/3.5, 350/314
[51] Int. Cl. ............................................ G02b 27/00
[58] Field of Search ................ 350/3.5, 162 SF, 314

[56] References Cited
UNITED STATES PATENTS
| | | | |
|---|---|---|---|
| 3,539,241 | 10/1970 | Upatnieks | 350/3.5 |
| 3,604,778 | 9/1971 | Burckhardt | 350/3.5 |
| 3,606,542 | 9/1971 | Kirk et al. | 350/3.5 |
| 3,650,595 | 3/1972 | Gerritsen et al. | 350/3.5 |

*Primary Examiner*—Ronald J. Stern
*Attorney, Agent, or Firm*—Craig & Antonelli

[57] ABSTRACT

A phase plate disposed in the object light beam path of a Fourier transform holography apparatus, has a phase surface on which a plurality of different continuous function shapes distributed at random are formed. In this manner phase of the object light passing through each portion of the phase plate is shifted continuously and at random within a range of from 0 to $2n\pi$. Thus, spectral maldistribution on the plane of a hologram can be prevented.

11 Claims, 26 Drawing Figures

INTENSITY DISTRIBUTION

PRIOR ART
INPUT WAVEFORM

PRIOR ART
INPUT WAVEFORM

PRIOR ART INTENSITY DISTRIBUTION

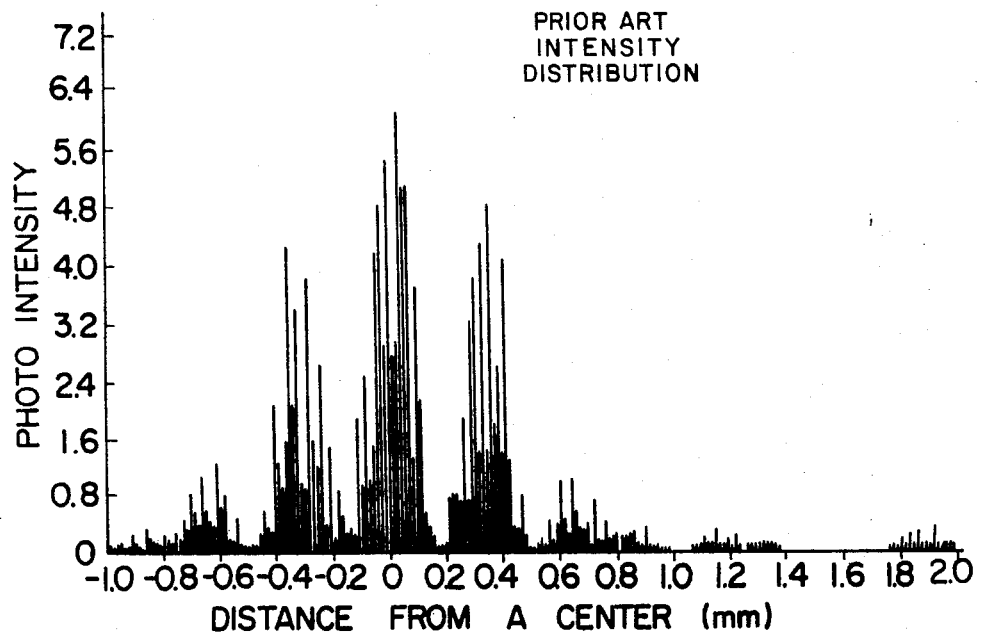
FIG. 10 PRIOR ART INTENSITY DISTRIBUTION
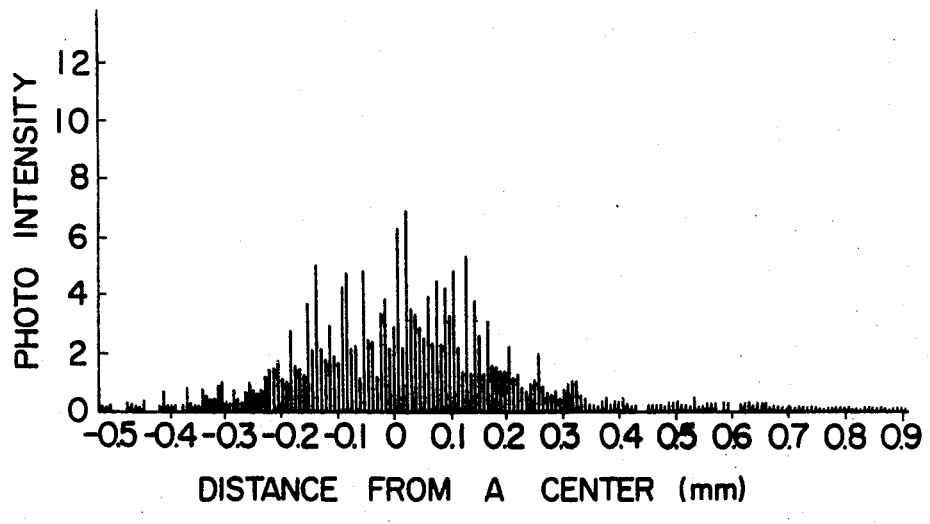
FIG. 11

3,829,193

IMPROVED RANDOM PHASE PLATE FOR FOURIER TRANSFORM HOLOGRAPHY

BACKGROUND OF THE INVENTION

The present invention relates to a Fourier transform holography apparatus, and more particularly to a holography apparatus which is provided with a phase plate suitable for making holograms of not only digital information but also analog pattern information such as a general figure, Chinese characters, the alphabet and numerals.

DESCRIPTION OF THE PRIOR ART

In holography, the following properties are required for a hologram of good quality. Memory density must be high, the reconstructed image must be of good quality and include little noise, the diffraction efficiency must be high, and the degree of maldistribution of information must be low. A method which is actually adopted most widely in order to use holography for forming an information memory is the Fourier transform holography method, employing lenses. A diagram of an apparatus for performing this method is shown in FIG. 1. Referring to the figure, a parallel light beam emerging from a laser source 11 is split into a transmitted light beam 13 (hereinbelow termed "object light beam" in this specification) and a reflected or reference light beam 14 (hereinafter called "reference light beam" in this specification) by means of a beam splitter 12. The object light 13 is magnified into a parallel light beam of large diameter by a beam expander 18, and is focused by a focussing lens 17 onto a hologram medium 15 located at the rear focal plane thereof. On the other hand, the reference light beam 14 is reflected by a reflector 19, and is illuminated on the same region on the hologram medium 15 as the object light beam 13. When the phase amplitude, or polarization of the object light beam 13 is modulated in response to information to be recorded, by means of an information imparting device 16 placed immediately behind the focussing lens 17, the object light beam 13 interferes with the reference light beam 14. As a result, information is stored in the hologram medium 15. An example of an information imparting device is a well-known bit information card.

As shown in FIG. 25, the card is constructed such that round holes are provided in conformity with a digital information pattern at suitable places among the positions arranged in the form of a matrix. A round hole corresponds to 1 bit of information. A problem in the case of employing the card is that, since energy is concentrated on very sharp spectral parts, as is apparent from FIG. 9, in consequence of the mutual interferences of light rays passing through the respective round holes, it is impossible to render the object light beam very intense relative to a reference light beam of fixed energy. This means the disadvantage that the reconstructing efficiency cannot be made very high. In the case of using a photographic dry plate as the hologram medium, when it is intended to suppress the intensity of the tip of a sharp spectrum to an appropriate level, the signal energy at the skirts of the spectrum falls into the insensitive part of the dry plate, to lower the quality of a reconstructed image. When, in contrast, the energy of the reference light beam is very intense, the top part of the spectrum falls into the saturation region of the photographic dry plate, to similarly lower the quality of a reconstructed image. A technique has heretofore been known in which, in order to provide improvements with respect of such disadvantages, the signal energy is prevented from being shaped into a sharp spectrum on the hologram medium, in such way that a phase plate, which can shift, at random, the phases of the light beams passing through the round holes of the card and which absorbs and scatters light only slightly, is arranged on the card by superposing it therein, so as to correspond to the positions of the round holes thereof. That is, the maximum value of the signal energy is made sufficiently small as compared with that in the case of using no phase plate to thereby enhance the reconstructing efficiency of the holography apparatus.

Before the prior-art technique employing the phase plate, a method in which the hologram plane is intentionally shifted from the position of the focal point was adopted in order to prevent the maximum light intensity on the hologram plane from being localized too excessively. Athough this method is effective for avoiding concentration of the light energy, it is inconvenient in the case where preparation of an information memory at a high density is desired with the size of a hologram limited to a predetermined area. Shifting the hologram plane from the focal plane makes it impossible to make the Fourier transform hologram. This leads to a further disadnvatage in that a Fresnel transform type hologram should be employed, which generally requires a hologram medium of higher resolution than the Fourier transform type.

A still further disadvantage is that when the hologram is made on the focal plane, all the 1-bit information contribute substantially equally at points on the hologram plane, whereas when the hologram plane is dislocated from the focal plane, the effect is decreased.

In contrast, the above-mentioned phase plate is a very effective means to reduce the concentration of the light energy upon specific spectra and to diminish the maldistribution of information on the hologram plane. Actually, the prior-art phase plate is very effective to enhance the quality of the hologram in the case where it is applied to a holography apparatus in which the information to be stored is a digital signal and in which the object light beam is modulated in the form of bit information in a matrix format. Since, however, random phase changes discontinuously occur in the object light beam in accordance with the action of the phase plate, the Fourier spectra are subject to separations as illustrated in FIG. 2. The effective hologram diameter becomes large when the phase plate is used and phase boundary lines are supposedly arranged inside the round bit hole and, particularly, in the case where analog information such as characters and patterns are recorded on the hologram medium. For this reason, when reconstruction is effected, bright and dark portions corresponding to the boundary lines of the phase occur in the reconstructed image, thus degrading the image quality.

SUMMARY OF THE INVENTION

An object of the present invention is to provide a phase plate which is particularly effective for use in holography apparatus for recording analog information on a hologram medium.

Another object of the present invention is to reduce the concentration of light energy upon specific spectra to thereby raise the reconstruction efficiency of a hologram, by the use of a phase plate as will be stated below.

Still another object of the present invention is to diminish maldistribution of information on a hologram plane.

A further object of the present invention is to enhance the quality of all types of analog information holograms.

A still further object of the present invention is to provide a holography apparatus which is capable of providing an information memory at high density.

The present invention is characterized in that, in order to accomplish the above-mentioned various objects, a phase plate is inserted into, for example, an object light beam path of a holography apparatus, the phase plate having a phase surface on which a plurality of different continuous function shapes distributed at random are formed.

The phase of the object light beam passing through the phase plate of the present invention is shifted at random, the quantity of the shift is continuously distributed between 0 and $2n\pi$ [rad.], and the absorption and scattering of light are only slightly effected at the shift.

BRIEF DESCRIPTION OF THE DRAWINGS

FIG. 10 is a diagram showing the intensity distribution of light on a hologram medium at the time when the prior-art phase plate is superposed on the card in a manner to be shifted therefrom for bit information;

FIG. 11 is a diagram showing the intensity distribution of light on a hologram medium in the case of bit information at the time when the phase plate of the present invention is superposed on the card;

DESCRIPTION OF THE PREFERRED EMBODIMENTS

Figure 3:
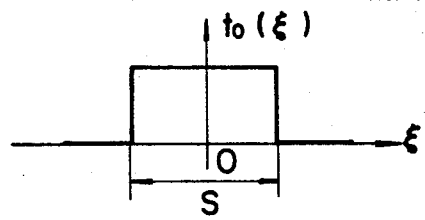
FIG. 3 is a diagram showing the wave form of an input signal of a prior-art Fourier transform hologram.
Figure 4:
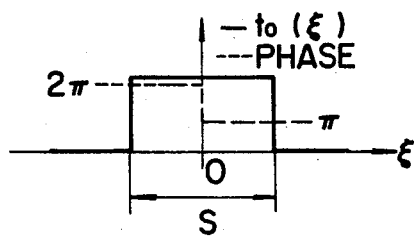
FIG. 4 is a digram showing the wave form of an input signal in the case where the prior-art phase plate is used.
Figure 5:
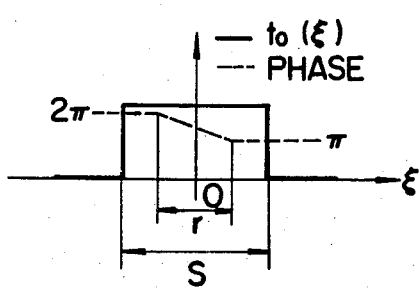
FIG. 5 is a diagram showing the wave form of an input signal in the case where a phase plate according to the present invention is used.
Figure 18A:
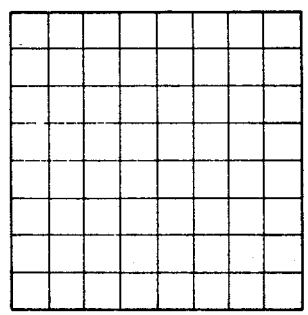
FIGS. 18(a) and (b) illustrate a prior-art phase plate for digital signals.
Figure 18B:

In order to facilitate an understanding of the advantages of the present invention over the prior-art method, description will be made of a case where one-dimensional information of only 1 bit is present. When no phase plate is used, the input signal of a Fourier transform hologram is as shown in FIG. 3. In the figure, full lines represent the shape of the information (object light beam) coming through a round hole. When a prior-art phase plate for digital signals as shown in FIGS. 18(a) and 18(b) is employed, the input signal is as shown in FIG. 4. In the figure, dotted lines represent phase changes. In this case, a discontinuous phase point lies inside the bit. The input signal in the case where a phase plate according to the present invention is disposed is illustrated in FIG. 5. The intensity distribution of diffracted light U (x) in each case is defined below, assuming that the shape of a signal from an information imparting device is:

$$t_0(\xi) = 1 : |\xi| \leq S/2$$
$$t_0(\xi) = 0 : |\xi| > S/2 \qquad (1)$$

where S indicates the diameter of the round hole.

1 — In the case where no phase plate is disposed, $$U_1(x) = C \int t_0(\xi) \exp[-ik(\xi x/f)] d\xi \qquad (2)$$

2 — In the case where the prior-art phase plate as shown in FIG. 18 is disposed, $$U_2(x) = C \int t_0(\xi) \exp[-ik(\xi x/f) - i\phi_1] d\xi \qquad (3)$$

3 — In the case where the phase plate of the present invention is disposed, $$U_3(x) = C \int t_0(\xi) \exp[-ik(\xi x/f) - i\phi_2] d\xi \qquad (4)$$

Herein, C signifies a term proportional to the amplitude of incident light and is regarded as a constant, $\xi$ signifies the axis of the coordinates on the plane of the information imparting device, and $x$ signifies an axis on the Fourier plane. $\phi_1$ and $\phi_2$ are the magnitudes of the quantities of phase shift brought about by the phase plates, and can be expressed as follows:

$$\phi_1 = \begin{cases} 2\pi : -(S/2) \leq \xi \leq 0 \\ \pi : 0 < \xi \leq (S/2) \end{cases}$$

and $$\phi_2 = \begin{cases} 2\pi : -(S/2) \leq \xi \leq -(r/2) \\ (3/2)\pi - (\pi/r)\xi : -(r/2) \leq \xi < (r/2) \\ \pi : (r/2) \leq \xi \leq (S/2) \end{cases}$$

where $0 < r < S$.

Figure 6:
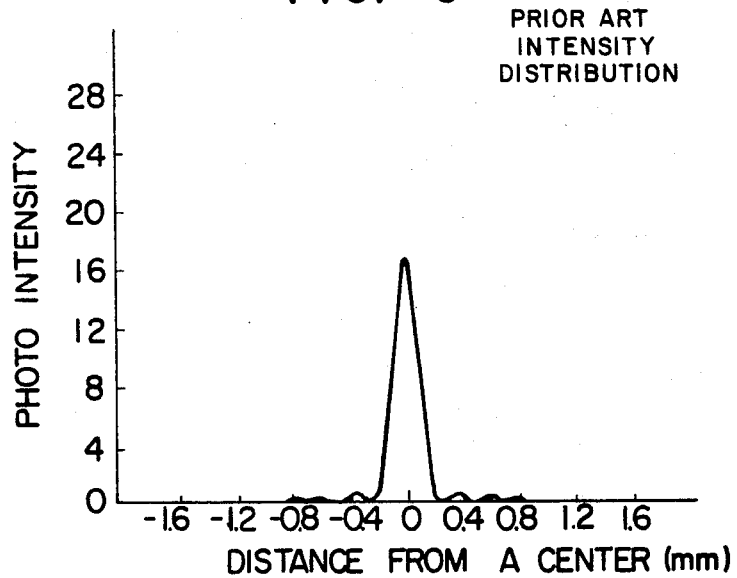
FIG. 6 is a diagram showing the intensity distribution of light on a hologram medium in the case where the input signal is that in FIG. 3.
Figure 7:
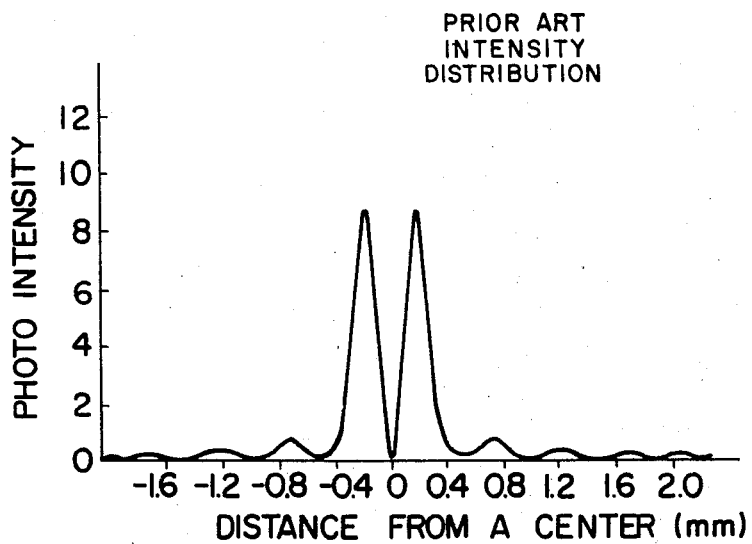
FIGS. 7 and 8 are diagrams showing the intensity distributions of light on hologram media in the cases where the input signals are those in FIGS. 4 and 5, respectively.
Figure 8:
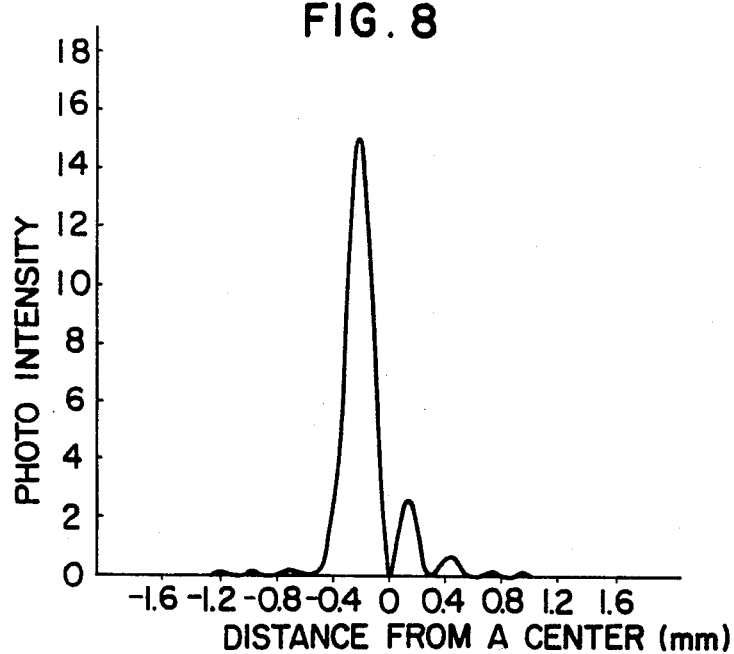

$|U_1(x)|^2$ is depicted in FIG. 6, $|U_2(x)|^2$ in FIG. 7, and $|U_3(x)|^2$ in FIG. 8. Since the phase is discontinuously changed in the case of $U_2(x)$, the spread of the spectra occurs on the high-frequency side at the Fourier plane, as is apparent from the drawing. The reason therefor is explained below.

The Fourier spectra of the object light beam subjected to phase changes conforming to a straight line of a slope $a$ are shifted from the center in accordance with the following equation:

$$F(x) = \int \exp(-ia\xi) \cdot \exp[i(2\pi x \xi/f\lambda)] d\xi \quad (5)$$

The center of the spectra satisfies:

$$(2\pi x \xi/f\lambda) - a\xi = 0$$

That is, (6)

$$x = (f\lambda a/2\pi)$$

Figure 24:
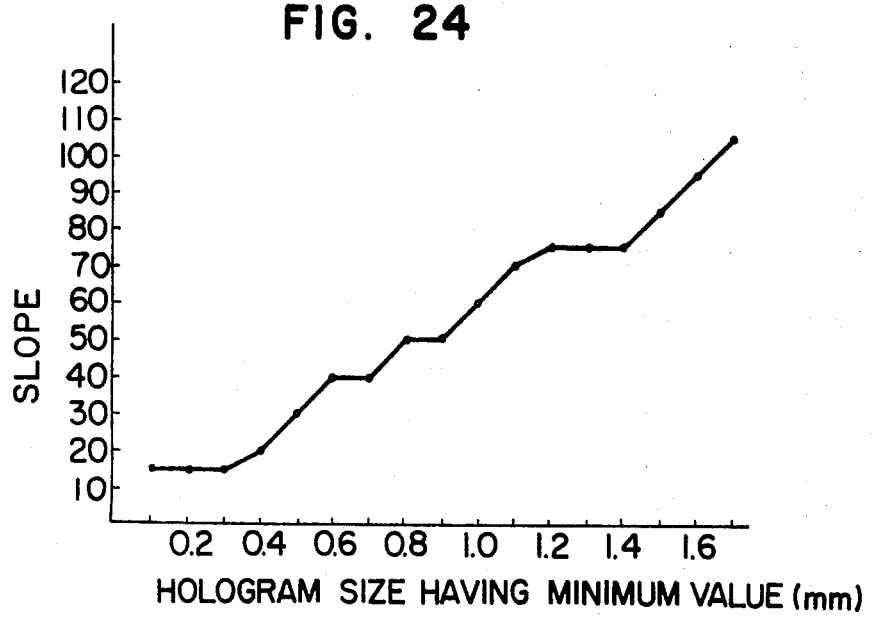
FIG. 24 is a curve diagram showing the relationship between the effective hologram diameter and the maximum allowable slope.
Figure 25:
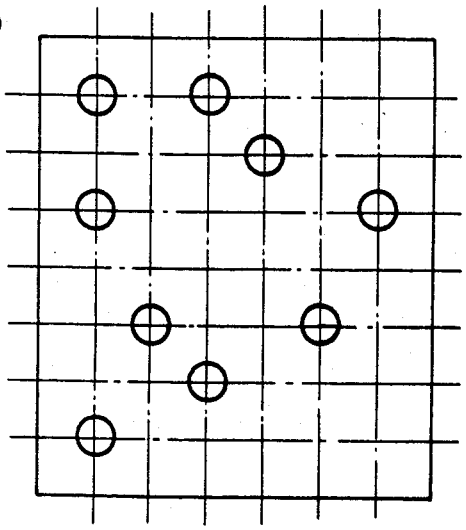
FIG. 25 is a diagram showing a prior-art bit information card.

Accordingly, when the phase changes discontinuously as for $U_2(x)$ and $a$ has a very large value, the spectrum of the object light at that point is brought much nearer to the high-frequency side on the Fourier plane. In the case of $U_3(x)$, the phase changes continuously, and the value of $a$ is not very large. The shift of the Fourier spectra is therefore decreased. Although spectral shifts at low frequencies appear, no considerable spread is exhibited as a whole. In the case where the effective hologram diameter is selected to be sufficiently large, information on the high-frequency side is also reconstructed and, hence, the value of the slope $a$ may be made relatively large. In this case, however, the density of information becomes low. When reconstruction is carried out with the effective hologram diameter set at a small value, the density becomes high. However, the information at the high-frequency portion is lost to degrade the quality of the reconstructed image. In the case where an image is expected which surpasses determined conditions in the signal-to-noise ratio, contour, uneven bright and dark portions, etc. of the reconstructed image, the minimum value of the effective hologram diameter required for a specifed slope is determined. This is shown in FIG. 24.

As is apparent from the figure, when an effective hologram diameter satisfying a required information density is determined, the maximum slope for achieving the reconstructed image of good quality is determined. Accordingly, a phase plate corresponding to the information can be made. On the other hand, in accordance with the previously-stated method in which the hologram plane is shifted from the position of the focal point (hereinbelow termed the "defocussing method"), the quantity of the shift must be made large in order to obtain a reconstructed image of good quality. As a result, the magnitude of the phase change due to the shift in the vicinity of the margin of the information imparting device (the card) becomes relatively large in terms of the slope of the straight line. Accordingly, the effective hologram diameter should also be made large. As regards the information density, the case of employing the phase plate of the present invention becomes ten or more times as high as the prior art. Letting, for example, one side of the card be 40mm, $f = 100$, $\lambda = 6 \times 10^{-4}$, the quantity of defocussing $\Delta = \Delta(f/f) = 0.05$ and the size of information $b = 0.1$mm, a phase change with which $y = A x^2$ is held is superposed on the information in conformity with the defocussing method, where $y$ indicates the magnitude of the phase plate, $x$ the distance from the center of the card and $A$ a coefficient expressed by:

$$A = \pi\Delta/f\lambda$$

At the margin of the card, the magnitude of the slope of the phase change becomes:

$$a = y' = 2 A b = 100.$$

On the other hand, the maximum slope for obtaining a reconstructed image of the same quality at the highest density by the use of the phase plate of the present invention becomes:

$$k = \pi/b = 31.4$$

As can be seen from FIG. 24, the ratio of the effective hologram diameter between both the methods is:

$$R_R : R_D \approx 4 : 1,$$

where $R_R$ and $R_D$ represent the effective hologram diameters in the case of employing the phase plate and in the case of the defocussing method, respectively.

Since the information density is inversely proportional to the square of the magnitude of the effective hologram diameter, the case of employing the phase plate of the present invention can increase the density to 16 times in comparison with the defocussing method.

As has been stated thus far, in accordance with the present invention, which uses the phase plate bringing about continuous phase changes, the large spread of the Fourier spectra is not caused, and simultaneously, the level of the spectrum of the maximum intensity can be lowered. Thus, enhancement of the quality of a reconstructed image and enhancement of the reconstructing efficiency can be attained.

The invention will be described in detail hereunder in connection with its preferred embodiments. In order that the advantages of the present invention may be easily understood in comparison with the prior-art methods, a case where information is in one dimension will be stated.

Figure 1:
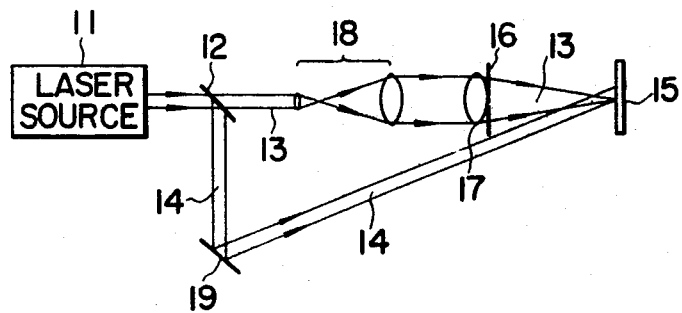
FIG. 1 is a schematic view of a prior-art holography memory apparatus.
Figure 2:
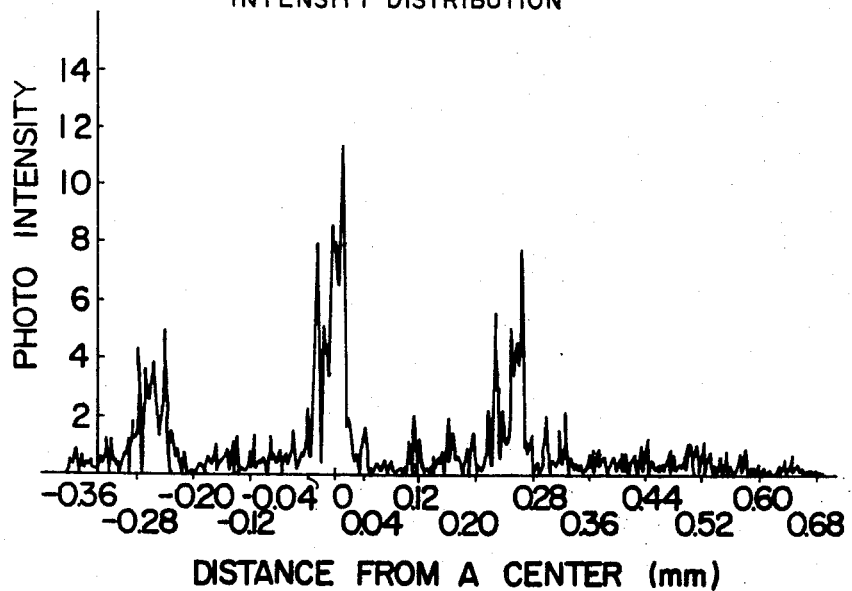
FIG. 2 is a diagram showing the light intensity distribution on a hologram medium at the time when a prior-art phase plate and a bit information card are arranged in shifted superposition.
Figure 9:
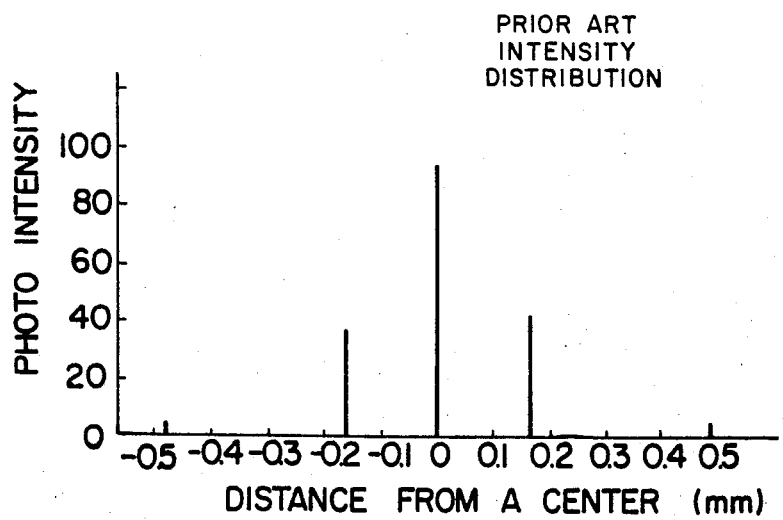
FIG. 9 is a diagram showing the intensity distribution of light on a hologram medium in the prior-art holography apparatus in the case of bit information.

In FIG. 1, the focal distance $f$ of the focussing lens 17 is assumed to be about 200mm, and a card is used as the information imparting device 16. First, consider bit information in which round holes of equal diameter are arranged at equal intervals. Let it be assumed that the diameter of the holes is about $250\mu$, that the pitch is about $500\mu$, that the quantity of information is 41, and that the card is located, in effect, immediately behind the object light focussing lens. The distribution of light intensity on the hologram medium 15 in the case where the medium 15 is arranged on the focal plane of the lens 17 and where no phase plate is disposed is illustrated in FIG. 9. The distribution is in the form of sharp spectra, and the information energy exists excessively locally. This is an extremely unpreferable state.

The distribution of the light intensity on the hologram medium 15 under the same conditions in the case where the prior-art discontinuous phase plate is disposed, so that the discontinuous phase point may be superposed inside the round hole, is shown in FIG. 10. The arbitrary unit of the ordinate represents the intensity of light transmitted through the card. The maximum intensity is improved by one order as compared with that in FIG. 9. Also, the distribution is relieved from local existence. However, the spectra are separated into several peaks, and the diameters of the holograms are expanded on the high-frequency side.

The distribution of light intensity on the hologram medium 15 under the same conditions in the case where the continuous-change phase plate of the present invention is superposedly disposed is illustrated in FIG. 11. The maximum light intensity is improved to the same extent as in FIG. 10, there is substantially no separation of the spectra, and the local existence of the distributed energy is perfectly relieved.

Figure 12:
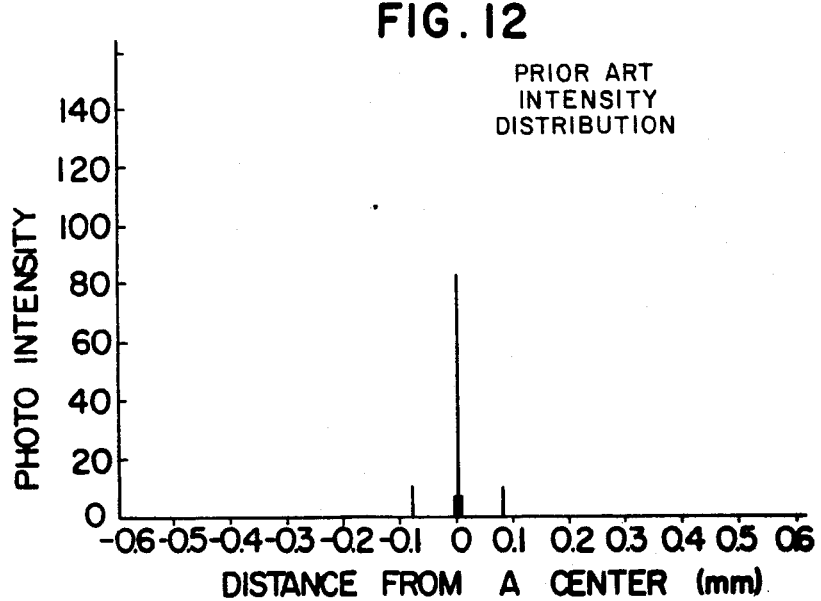
FIG. 12 is a diagram showing the intensity distribution of light in the case where information, such as alphabetic letters, arranged at random are recorded on a hologram medium by a prior-art method.
Figure 13:
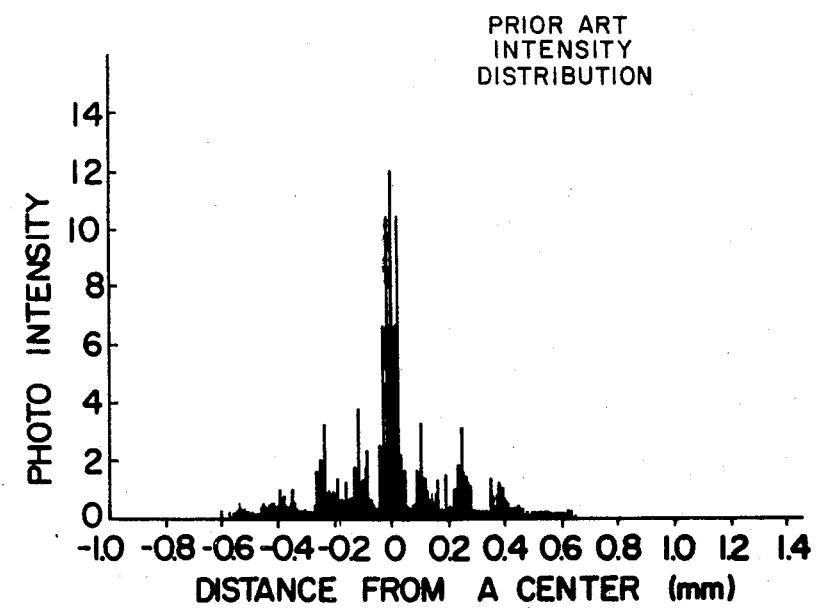
FIG. 13 is a diagram showing the intensity distribution of light on a hologram medium at the time when the prior-art phase plate is used in the case of FIG. 12.
Figure 14:
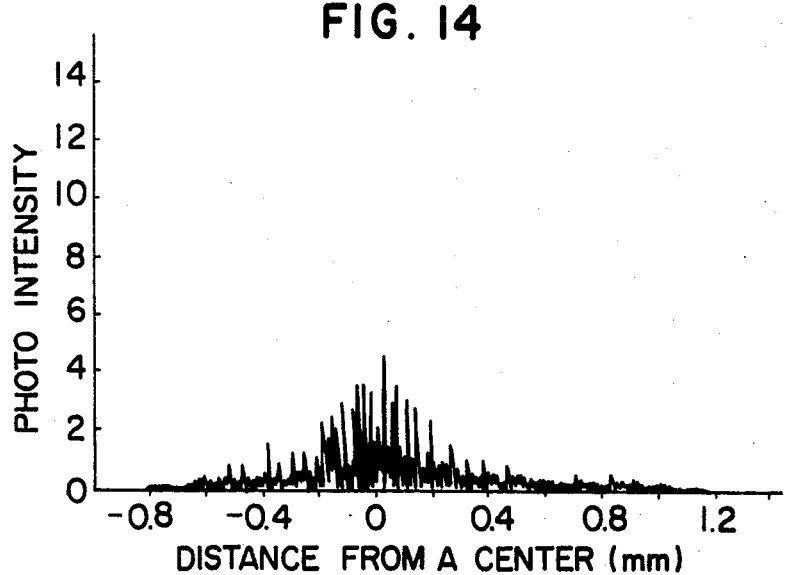
FIG. 14 is a diagram showing the intensity distribution of light on a hologram medium at the time when the phase plate of the present invention is used.

Shown in FIGS. 12, 13 and 14 are distributions of light intensity on the hologram medium 15 in the cases where the object beam is modulated by the information imparting device in response to one-dimensional information which correspond to alphabetic letters arranged at random. FIG. 12 corresponds to the case where no phase plate is used, FIG. 13 the case where the prior art discontinuous phase plate is used, and FIG. 14 the case where the continuous phase plate of the present invention is used. As can be understood from the drawings, the phase plate of the present invention is very effective not only for bit information having regularity, but also for general analog information having no particular regularity.

Figure 15:
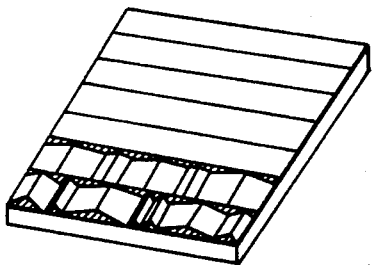
FIGS. 15 to 17 and FIGS. 19 to 23 are views showing embodiments of the phase plate of the present invention.
Figure 19:
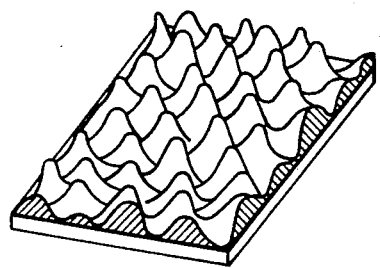
Figure 20:
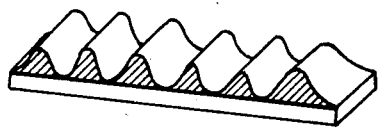

In the case where the information constitutes a two-dimensional analog pattern, the phase shifts to which the parallel light beam is subjected by passing through the phase plate of the present invention conform to a random one-dimensional or two-dimensional continuous function, as shown in FIG. 20 or FIG. 19, having no regularity and in which the distribution of the shifts changes between 0 and $2\pi$ radians. Included among the continuous functions are, for example, sinusoidal functions, repetitive functions of the Gaussian distribution type, polygonal line functions (approximated straight line functions), etc. The phase plate of the present invention shall cover a structure in which, as shown in FIG. 15, a plurality of unit plates each providing one-dimensional phase changes are arranged on a plane in parallel so that their phase changing directions may be identical. An advantage in this case is that, since the phase changes are one-dimensional preparation of the phase plate is easier than in the case of two dimensions. In addition, the invention covers the use of a phase plate assembly in which two such one-dimensional phase plates are superposedly arranged so that the one-dimensional phase-changing directions may intersect with each other. An advantage of this case is that the one-dimensional phase plates which are easily prepared are made applicable to a two-dimensional pattern by employing them in the intersected state.

Figure 16:
Figure 21:
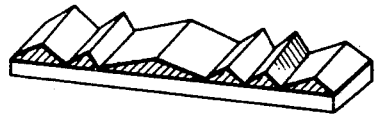

As discussed above, the function shape of a polygonal line function is included as the continuous function distributed on the one-dimensionally changing phase plate. The invention covers a phase plate in which the phase shifts, to which the parallel light beam is subjected by passing therethrough, are continuously changed between 0 and $2n\pi$ ($n$ being a positive integer) radians in conformity with the polygonal line function. An advantage of such a phase plate resides in that the polygonal line fucntion is very convenient for uniformly imparting phase changes of from 0 to $2n\pi$ radians. Furthermore, the function is continuous. The polygonal line function shall include these, as illustrated in FIGS. 16 and 21, in which the oblique lines of isosceles triangles having random base lengths and equal heights are connected. An advantage in this case resides in that, when the polygonal line function is in the form of the oblique lines of isosceles triangles, the Fourier spectra are distributed on the hologram plane in bilateral symmetry with respect to the center, thus preventing an unbalance of the spectra from appearing. In addition, owing to the fact that the lengths of the bases are randomly distributed, the slopes of the oblique lines of the isosceles triangles are random, to reduce maldistribution of the spectra on the hologram plane. The phase plate of the present invention also covers one in which the isosceles triangles having specific base lengths are distributed, so that the occupation rate with respect to the whole phase plate may be smaller as the base lengths become larger. An advantage in this case is that, since the Fourier spectra due to a gentler slope of the oblique lines of the isosceles triangle contain an intenser spectrum at a low-frequency portion than at a high-frequency portion on the hologram plane, the spectral intensity is made uniform by reducing such intenser spectra.

Figure 17:
Figure 22:

The invention further includes a phase plate, as shown in FIGS. 17 and 22, in which the polygonal line function contains, in the foregoing consecutive isosceles triangles, at least one portion in which the phase shift imparted to the passing light beam is constant. An advantage in this case is that, wehreas a spectrum is reduced at the central part of the Fourier spectra in the foregoing phase plate composed only of the isosceles triangles, the sectrum at the hologram center is generated by adding the constant phase portion parallel to the bases.

Figure 23:
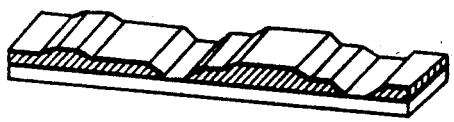

The phase plate of the present invention also covers an embodiment, as shown in FIG. 23, in which stepped changing parts, of the shown phase plate, as illustrated in FIG. 18 are consecutively connected by straight lines or curves which have slopes less than a specified value. Since, in this case, inclined surfaces at the connected parts have their positions distributed at random, no spectral maldistribution occurs on the hologram plane, even if equal slopes occur. By way of example, in a phase plate which can impart phases of 0, $\pi$ and $2\pi$ existing at random at equal pitches and in which the sum of the numbers of the parts capable of imparting phase changes of 0 and $2\pi$ is equal to the number of the parts capable of imparting the phase change of $\pi$, the phase changing parts are connected as shown in FIG. 23 by straight lines in which the absolute values of their slopes are equal within the above-stated allowable slope and in which the slopes have both positive and negative polarities.

Description will now be made of a method for producing the foregoing phase plate.

The respective function shapes are generated by means of an electronic computer, and are displayed on a cathode-ray tube in the form of differences in brightness. A photographic dry plate is exposed to light using the display. After development and fixation, the dry plate is bleached to thereby obtain required characteristics exhibited positively. More specifically, at the stage at which the photographic dry plate has been subjected to the exposure, development and fixation, it has a white and black density distribution. Deposited sliver of the dry plate is changed by e.g., potassium ferricyanide, chromiumin-tensifier (trade name, Kodak) and mercuric chloride into $Ag_4Fe(CN)_6$, $AgCl + HgCl$ and $AgCl + Cr_2Cl_3$, respectively, which are substances small in the light absorption factor and large in the refractive index. Thus, the desired characteristics can be obtained. A method may also be adopted in which an electron beam recording device is employed instead of generating the images on the cathode-ray tube. A method is also considered in which the phase plate is produced using gelatin bichromate for the dry plate.

It is a matter, of course, that the phase plate of the present invention does not relate to a diffuser which is mainly directed to the scattering of light. As is apparent from the previous description, the shape of the continuous function may be arbitrarily determined, so that it may have a differential coefficient which corresponds to the density of information imparted to the information imparting device, that the phase shifts may fall within a predetermined range, or that the shape may combine both of these measures.

When the phase plate of the present invention is actually manufactured, it is sometimes the case that the intended shape, e.g., the isosceles triangle is not obtained in the perfect form, but that it is somewhat distorted. Such distortion, however, raises no problem since the effect of the present invention can be substantially achieved.

Although natural, the phase distribution imparted by the phase plate of the present invention may be made so as to lie within the range of from 0 to $2n\pi$ ($n = 1, 2, \ldots$). Further, a similar effect is obtained when a dry plate in which potassium bichromate is dissolved in polymethyl-meta-acrylate is used in place of the above-mentioned gelatin bichromate dry plate.

As described above, in accordance with the present invention, the Fourier transform hologram of a general analog pattern or a bit pattern can be formed with a good reconstruction efficiency, with a reduced maldistribution of information and at a high density. Furthermore, when the prior-art phase is employed in the case of the hologram recording of bit information, care should be taken for the correspondence between the round holes and the positions of the phase plate for superposition. In contrast, when the phase plate of the invention is used, superposition, which is not very exact, is satisfactory, and a similar effect is attained without the necessity in the prior art of paying particular attention to the correspondence of the positions.

We claim:

1. In a holograph apparatus for forming a Fourier transform hologram comprising:
   coherent light source means for producing an object light beam and a reference light beam;
   modulating means for modulating the object light beam in response to information to be recorded;
   optical means, including a Fourier transform lens, for producing, at the focal plane of the lens, an interference pattern between the modulated object beam and the reference light beam;
   a recording medium located near the focal plane of said lens, so as to form a Fourier transform hologram thereon; and
   a phase plate made of a transparent material and disposed in the object light beam path;
   the improvement wherein
   said phase plate is so formed that its phase surface is composed of a plurality of different continuous functional shapes distributed at random, whereby the phase of the object light passing through each portion of the phase plate can be shifted at random.

2. A holography apparatus according to claim 1, wherein the thickness of said phase plate varies in at least one direction in accordance with a differential function of a density distribution function of said information.

3. A holography apparatus according to claim 1, wherein the phase plate is so formed that said continuous function shapes are distributed uniformly in one direction and at random in another direction perpendicular to said one direction.

4. A holography apparatus according to claim 1, wherein said phase plate consists of a plurality of similar plates on each surface of which the different continuous function shapes are so formed as to be distributed in a single direction, said respective similar plates being arranged in planes parallel with each other.

5. A holography apparatus according to claim 4, wherein every pair of said similar plates are superposed on each other so that the shifted phase directions of the object light shifted by said two plates are perpendicular to each other.

6. A holography apparatus according to claim 1, wherein the continuous function shapes of said phase plate are approximated by a plurality of straight lines so that the phase of the object light passing therethrough lies on an average within a range of from 0 to $2n\pi$ radians where $n$ is an integer.

7. A holography apparatus according to claim 1, wherein the continuous function shapes of said phase plate are isosceles triangular shapes, all the heights of which are equal, said isosceles triangular shapes being so arranged that their bases are of different lengths and disposed at random.

8. A holography apparatus according to claim 6, wherein said phase plate has at least one area across which the quantity of the phase shift of said object light beam is constant.

9. A method of producing a Fourier transform hologram comprising the steps of:
   providing a first coherent energy beam;
   providing a second coherent energy beam;
   modulating said first beam in accordance with information to be recorded;
   randomly modifying the phase of said modulated first beam in accordance with a plurality of different continuous function shapes distributed across said first beam at random;
   forming a Fourier transform of said randomly modified first beam; and
   directing said modified first beam and said second beam onto a hologram recording medium, so that said beams interfere thereon to provide a Fourier transform hologram, in which spectral maldistribution is substantially prevented.

10. A method of producing a Fourier transform hologram according to claim 9, wherein said first and second energy beams are light beams and said step of modifying comprises the steps of providing a phase plate made of transparent material and inserting said plate into the path of said first beam, said phase plate having a phase surface on which a plurality of different continuous function shapes distributed at random are formed so that the phase of said first beam passing through each portion of said phase plate can be shifted at random.

11. A method of producing a Fourier transform hologram according to claim 10 wherein said step of providing a phase plate comprises the steps of generating a light pattern representative of a plurality of different continuous function shapes distributed at random;

exposing a photographic dry plate to said light pattern; and bleaching the exposed plate, to thereby provide said phase plate.

* * * * *